May 20, 1924.

S. E. ALLEY 1,494,569

FLUID OPERATED BRAKING SYSTEM

Filed Nov. 26, 1923    2 Sheets-Sheet 1

May 20, 1924.

S. E. ALLEY 1,494,569

FLUID OPERATED BRAKING SYSTEM

Filed Nov. 26, 1923

INVENTOR
Stephen E. Alley
BY Watson, Coit, More & Grindle
ATTYS.

Patented May 20, 1924.

1,494,569

UNITED STATES PATENT OFFICE.

STEPHEN EVANS ALLEY, OF WESTMINSTER, LONDON, ENGLAND, ASSIGNOR TO THE "SENTINEL" WAGGON WORKS (1920) LIMITED, OF WESTMINSTER, LONDON, ENGLAND, A BRITISH COMPANY.

FLUID-OPERATED BRAKING SYSTEM.

Application filed November 26, 1923. Serial No. 677,122.

*To all whom it may concern:*

Be it known that I, STEPHEN EVANS ALLEY, a subject of the King of England, residing at Westminster, London, England, have invented certain new and useful Improvements in Fluid-Operated Braking Systems, of which the following is a specification.

This invention is for improvements in or relating to fluid-operated braking systems and has for one of its objects to improve the efficiency and reliability of vacuum braking systems.

According to one feature of the present invention there is provided a vacuum braking system in which the operator's control-element is directly coupled to a piston-member, other than the main braking piston, a face of which first-named piston-member is exposed to the vacuum in the system when braking is taking place and the opposite face of which is accessible to the atmosphere. In this way the vacuum in the braking system will exert a pull upon the piston-member and give a re-action to the operator's control-element corresponding in intensity to the force being applied to the main braking piston. The operator will thus receive an indication of this last-named force and be enabled to graduate it. Conveniently the said piston-member coupled to the operator's control-element serves as the valve for controlling communication between the main braking piston and the means creating the vacuum, thus simplifying and increasing the safety of the system.

According to another feature of the invention there is provided a vacuum braking system comprising the combination with a source of pressure, an ejector, and a conduit leading to the main braking piston, from which conduit air can be exhausted by the ejector, of an operator's control-element for the system, and a piston-member, other than the main braking piston, directly coupled to the said control-element, which piston-member controls communication between the source of pressure and the ejector, and between the ejector and the braking system, and has, for the purpose already indicated, one face exposed to the vacuum in the system when braking is taking place and the opposite face accessible to the atmosphere. There is thus provided a simple and compact arrangement of controlling mechanism for the system in which the parts to be manipulated by the operator are reduced to the minimum.

Preferably there is combined with the piston-member coupled to the operator's control-element, a venting valve for destroying the vacuum in the braking system, which valve is opened by the said piston-member when the latter reaches the position it occupies when braking is not taking place. When this venting valve is provided, it will be found advantageous to have the parts so arranged that the piston member in returning to the position it occupies when braking is not taking place first shuts off communication between the main braking piston and the means creating the vacuum, and subsequently destroys the vacuum in the braking system.

For a more complete understanding of the invention there will now be described, by way of example only and with reference to the accompanying drawings, one constructional form of controlling mechanism for a vacuum braking system according to the invention. It is to be understood, however, that the invention is not limited to the precise constructional details set forth.

In these drawings:—

Like reference numerals indicate like parts throughout the drawings.

Figure 1:
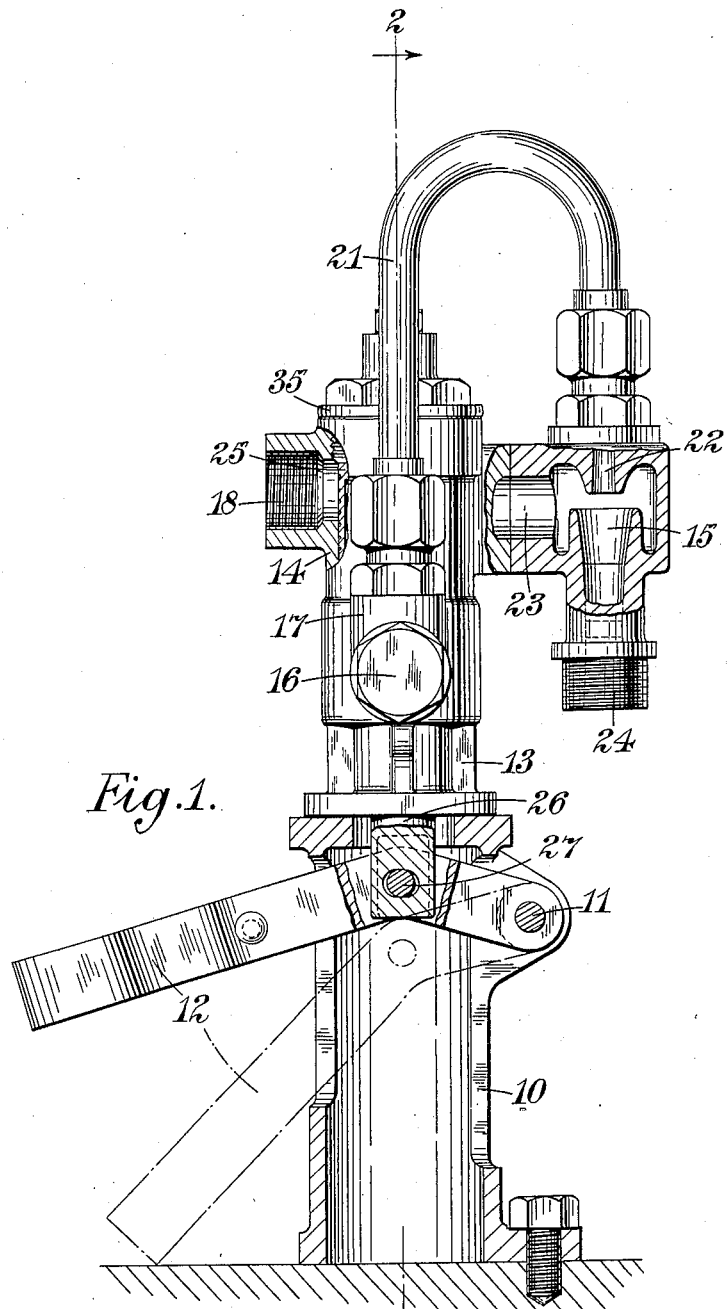
Figure 1 is a side elevation partly in section of the mechanism.
Figure 2:
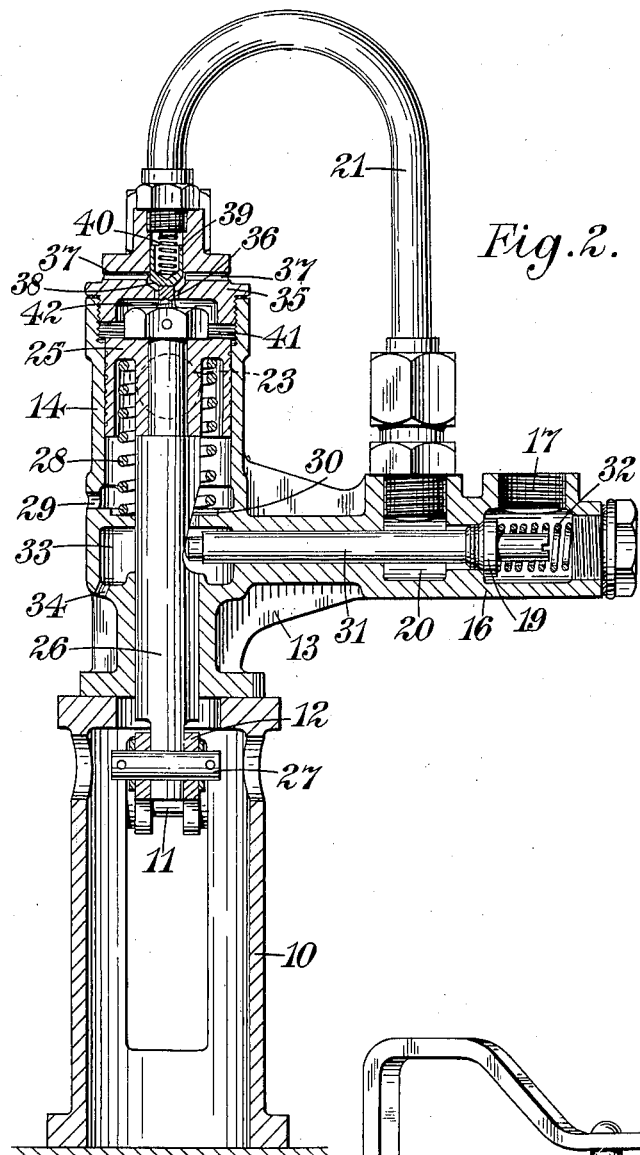
Figure 2 is a section on the line 2—2 of Figure 1.
Figure 3:
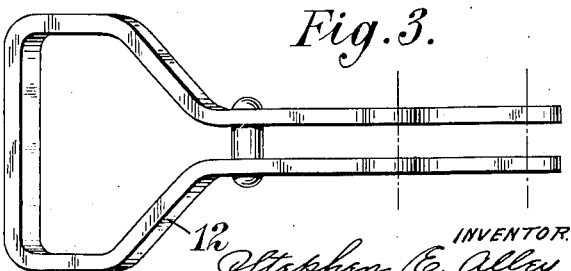
Figure 3 is a detail view of the operator's pedal.

The construction illustrated comprises a base standard 10 in which is pivoted at 11 an operator's control-element 12 which takes the form of a pedal, but which could, of course, take other forms if desired. Supported upon the standard 10 is a casing 13 providing an upright cylinder 14 situated immediately over the standard 10, an ejector 15 and a valve casing 16. A steam inlet is shown at 17 and a connection leading to the braking system at 18. Within the valve casing 16 is a valve 19 controlling the passage of steam from the inlet 17 to a chamber 20. The chamber 20 communicates by a pipe 21 with the inlet 22 to the ejector 15. The ejector 15 is connected by a conduit 23 with the cylinder 14 and at 24 is shown the outlet connection of the ejector.

Within the cylinder 14 is a piston 25 having a piston rod 26 which is pivoted at 27 to the pedal 12. The piston 25 is pressed upwards by a spring 28 and the space below the piston is in free communication with the atmosphere through the aperture 29. Intermediate its ends, the rod 26 is cut away to provide a cam face 30 against which bears the end of the stem 31 of the valve 19. This valve is pressed towards its closing position by a spring 32 and is opened by the cam face 30 when the pedal 12 is depressed. The end of the stem 31 projects into a chamber 33 below the cylinder 14, which chamber has a drainage outlet 34.

At the upper end of the cylinder 14 is a cap 35 which has a central perforation 36 communicating with lateral venting conduits 37. Between the perforation 36 and the conduits 37 a valve seat 38 is formed towards which a valve 39 is pressed by a spring 40. Projecting from the upper end of the rod 26 or of the nut 41 upon it, is a boss 42 which lifts the valve 39 from its seat when the piston 25 reaches the upper limit of its travel. The conduit 18 is so situated that it is never entirely closed by the piston 25 and thus will always be in communication with the perforation 36.

In operation, to apply the brakes, the operator will depress the pedal 12 thereby drawing down the rod 26 and piston 25. As the rod 26 moves down it will open the valve 19 and admit steam to the ejector 15, and as the piston 25 moves down it will uncover the end of the conduit 23 and place the latter in communication with the conduit 18. Thus the vacuum created by the ejector 15 will extend from the conduit 23 to the braking system. This vacuum, however, will also tend to lift the piston 25 and thus will give the re-action upon the pedal 12 to the operator's push thereon. The function of this re-action has already been described.

When braking is no longer required, the operator withdraws his foot from the pedal 12 and it moves upwardly. In so doing the valve 19 is permitted to close and the piston 25 first closes the end of the conduit 23 and subsequently opens the venting valve 39. Thus the vacuum is destroyed in the braking system and the latter effectively shut off from the ejector which may be of importance if the latter happens to become leaky. It also prevents condensed steam being drawn back into the brake pipe when the steam valve closes.

It is to be understood that the invention is not limited to the precise constructional details hereinbefore set forth.

I claim:—

1. In a vacuum braking system, the combination with the operator's control-element, of a piston-member other than the main braking piston, means for directly coupling the said control-element and piston-member together, and means whereby a face of the piston-member is exposed to the vacuum in the system when braking is taking place and the opposite face exposed to atmosphere, for the purpose specified.

2. In a vacuum braking system, the combination with an operator's controlling lever, of a piston-member other than the main braking piston, one face of which piston-member is exposed to atmosphere, a conduit opening towards the other face and adapted to communicate with the vacuum chamber for the main braking piston, and a rod directly coupling the controlling lever and the piston-member.

3. In a vacuum braking system, the combination with means for creating a vacuum, a conduit connecting said means with the main braking piston, a piston-member other than the main braking piston which is adapted to close said conduit, an operator's control-element, means for directly coupling the said control-element and the piston-member together and means whereby one face of said piston-member is exposed to atmosphere, the said piston-member being adapted to be moved into position to open the said conduit and thereby expose its other face to the vacuum in the system when braking is taking place, for the purpose specified.

4. A vacuum braking system, comprising the combination with a source of pressure, an ejector, and a conduit leading to the main braking piston, from which conduit air can be exhausted by the ejector, of an operator's control-element for the system, a piston-member other than the main braking piston having one face exposed to the vacuum in the system when braking is taking place and the opposite face accesssible to the atmosphere, means for directly coupling the said piston-member to the control-element, and means whereby the said piston-member controls communication between the source of pressure and the ejector, and between the ejector and the braking system.

5. A vacuum braking system, comprising the combination with a source of pressure, an ejector, and a conduit leading to the main braking piston from the ejector, of an operator's control-element for the system, a piston-member other than the main braking piston having one face exposed to the vacuum in the system when braking is taking place and the opposite face accessible to the atmosphere and being arranged to move into said conduit to close it, means for directly coupling the said piston-member to the control-element, a cam moving with said piston-member and a valve operated by said cam to control communication between the source of pressure and the ejector.

6. In a vacuum braking system, the combination with the operator's control-element, of a piston-member other than the main braking piston, means for directly coupling the said control-element and piston-member together, means whereby a face of the piston member is exposed to the vacuum in the system when braking is taking place and the opposite face exposed to atmosphere, a venting valve for destroying the vacuum in the braking system, and means whereby said valve is opened by the piston-member when the latter reaches the position it occupies when braking is not taking place.

7. In a vacuum braking system, the combination with the operator's control-element, of a piston-member other than the main braking piston, means for directly coupling the said control-element and piston-member together, means whereby a face of the piston-member is exposed to the vacuum in the system when braking is taking place and the opposite face exposed to atmosphere, a venting valve for destroying the vacuum in the braking system, means tending to close said valve, and an extension on the said piston-member adapted to open the valve when the piston-member reaches the position it occupies when braking is not taking place.

8. In a vacuum braking system, the combination with means for creating a vacuum, a conduit connecting said means with the main braking piston, a piston-member other than the main braking piston which is adapted to close said conduit, an operator's control-element, means for directly coupling the said control-element and the piston-member together, one face of said piston-member being exposed to atmosphere and the said piston-member being adapted to be moved into position to open the said conduit and thereby expose its opposite face to the vacuum in the system when braking is taking place, a venting valve for destroying the vacuum in the braking system, and means whereby said valve is opened by the piston-member.

9. In a vacuum braking system, the combination with means for creating a vacuum, a conduit connecting said means with the main braking piston, a piston-member other than the main braking piston which is adapted to close said conduit, an operator's control-element, means for directly coupling the said control-element and the piston-member together, one face of said piston-member being exposed to atmosphere and the said piston-member being adapted to be moved into position to open the said conduit and thereby expose its opposite face to the vacuum in the system when braking is taking place, a venting valve for destroying the vacuum in the braking system, and means whereby the said piston member in returning to the position it occupies when braking is not taking place first closes the said conduit between the main braking piston and the means for creating the vacuum, and subsequently opens the said venting valve and destroys the vacuum in the braking system.

In testimony whereof I affix my signature.

STEPHEN EVANS ALLEY.